United States Patent [19]

Thomas

[11] Patent Number: 5,165,766

[45] Date of Patent: Nov. 24, 1992

[54] TRAM CHAIN CONNECTION LINK

[75] Inventor: Terry M. Thomas, Franklin, Pa.

[73] Assignee: Joy Technologies Inc., Pittsburgh, Pa.

[21] Appl. No.: 638,947

[22] Filed: Jan. 9, 1991

[51] Int. Cl.⁵ .......................................... B62D 55/253
[52] U.S. Cl. .......................................... 305/39; 305/40; 198/731
[58] Field of Search .................. 305/35 R, 39, 40, 45, 305/58 R; 198/300, 303, 861.2, 731

[56] References Cited

U.S. PATENT DOCUMENTS

| | | | |
|---|---|---|---|
| 1,360,115 | 11/1920 | Kemper | 305/39 |
| 1,446,712 | 2/1923 | McMillan et al. | 305/40 X |
| 3,383,140 | 5/1968 | Stalberg | 305/39 X |
| 3,387,896 | 11/1968 | Sobota | 305/40 X |
| 4,027,793 | 6/1977 | Lampl et al. | 198/731 X |
| 4,079,833 | 3/1978 | Rollins | 198/731 |
| 4,828,339 | 5/1989 | Thomas et al. | 305/39 |
| 4,989,724 | 2/1991 | Komotzki | 198/731 |

Primary Examiner—Russell D. Stormer
Attorney, Agent, or Firm—Kirkpatrick & Lockhart

[57] ABSTRACT

A connection link for coupling together the first and second chain links of a tram chain normally used to propel mobile articulating mining conveyors. The first and second tram chain links are hooked through a "U"-shaped member and are captively held in a relatively static position by a retaining member. The ends of the "U"-shaped member are threaded and extend through the retaining member to engage corresponding fastening nuts to thereby enable the retaining member to be separated from the "U"-shaped member. A tram chain crawler pad, similarly adapted to engage the "U"-shaped member, may also serve as a retaining member.

14 Claims, 4 Drawing Sheets

TRAM CHAIN CONNECTION LINK

BACKGROUND OF THE INVENTION

1. Field of the Invention

The present invention relates to connection links for chains and, in particular, to connection links for tram chains used in the mining industry.

2. Description of the Invention Background

In the materials mining industry, especially in the underground mining of coal and the like, conveyors are used to transport the mined ore from the seam. Such conveyors are generally chain driven or utilize chain to drive various pieces of machinery or haulage vehicles. One type of conveyor that specifically uses chain in its operation is known as a mobile articulated conveyor. Such conveyor provides for continuous transport of the discharge of a continuous mining machine to a main conveyor as the mining machine advances into the mine faze and changes the direction of its forward movement. The articulated conveyor includes a plurality of pivotally connected framework elements. The framework elements cooperate to support a driveable conveyor belt. The articulated conveyor system is moved along the mine surface by separate traction drive means which generally consists of a driven endless crawler or tram chain that has a series of crawler pads attached to the chain links. In order to facilitate installation, removal and repair of such endless tram chain, the chain is assembled with connection links that permit the chain to be separated.

A prior connection link design is illustrated in FIGS. 1, 2 and 3. As shown in FIG. 3, the prior design 200 generally consists of a "U"-shaped member 212 that has a central bottom member 214 from which extends a first leg 216 and a second leg 218. First leg 216 and second leg 218 are connected to the ends of central bottom member 214 such that they extend generally perpendicularly therefrom. However, as shown in FIG. 3, first leg 216 and second leg 218 extend inward toward one another. Both first leg 216 and second leg 218 include an enlarged heel portion shown as 220a and 220b, respectively. Enlarged heel portions 220a and 220b are provided to extend toward one another so that the distance between first leg 216 and second leg 218, which forms an opening 222, is substantially narrower than the primary opening 224 formed between the legs 216 and 218. Accordingly, there is provided a central opening 223 which is bounded by first opening 222, elongated heels 220 and central bottom member 214.

In accordance with the connection process, a first tram chain link 226, generally oval in shape in plan view and of circular cross-section which has an elongated opening therethrough, is entered through first opening 222 and hooked over first leg 216. A similar second tram chain link 228 is entered through first opening 222 and is hooked over second leg 218. The first chain link 226 and second chain link 228 are separated in central opening 223 by separating member 215 on bottom member 214. Separating member 215 is centrally disposed within primary opening 224 and is connected to central bottom member 214 such that it extends generally perpendicularly therefrom. Finally, first chain link 226 and second chain link 228 are retained in position by a crawler pad assembly, generally shown as 230, which is adapted for releasable connection to "U"-shaped member 212. As shown in FIGS. 1 and 2 crawler pad assembly 230 includes two (2) oppositely extending lateral crawler pad members 232 and 234. Crawler pad members 232 and 234 are releasably connected to "U"-shaped member 212 by cap screws 231 that extend through apertures 221a and 221b located in enlarged heel portions 220a and 220b, respectively, of "U"-shaped member 212. Cap screws 231 are then threadably received in corresponding threaded apertures 236 and 238 located in crawler pad members 232 and 234, respectively. First chain link 226 and second chain link 228 are retained in a relatively static position within central opening 223 by lock block 240 which is a separate element of crawler pad assembly 230 which is retained between crawler pad members 232 and 234.

As can be seen from FIGS. 1, 2 and 3, the prior design has disadvantages in several respects. In particular, the narrow nature of first opening 222 requires that a sufficient amount of chain slack be present in order to permit first chain link 226 and second chain link 228 to be hooked over enlarged heel portions 220. Oftentimes, in order to achieve the necessary slack, the tram chain drive sprockets must be moved or, in the alternative, the tram chain must be removed from the drive sprockets. Moreover, as the crawler pads advance and grip the mine surface, they tend to become partially embedded in the mine floor which thereby increases the difficulty in achieving even small amounts of chain slack.

Another serious problem inherent in the prior design is the failure of the cap screws that retain the crawler pads to the "U"-shaped members. As shown in FIG. 1, crawler pad assembly 230 is transversely mounted with respect to the axis of chain travel. Cap screws 231 are also mounted in a direction that is traverse to the axis of chain travel. Accordingly, it is not uncommon for the crawler pads to twist about the axis of travel as they encounter the irregularities of the mine floor. Such twisting action causes shear forces to develop at cap screws 231 which result in metal fatigue and over time ultimately cause cap screw failure.

The subject invention is directed toward an improved design for connection links for tram chains which overcomes, among others, the above-discussed problems and which provides for a more useful means of tram chain connection which does not require as much chain slack to be present during the connection process. In addition, the new connection link design eliminates connector failure caused by shear forces developed during the conveying process.

SUMMARY OF THE INVENTION

In accordance with the present invention, there is provided an improved design for a connection link for tram chains, as well as more customary chains. Tram chains are used in the mining industry to drive mobile articulated conveyors along the mine surface and generally consist of a plurality of horizontal first chain links interconnected with a plurality of second vertical chain links to form an endless chain. Moreover, to enable the tram chain to drive the conveyor across the mine surface, a series of crawler pads are attached to the chain at various intervals. The tram chain connection link provided includes a "U"-shaped member that has two leg portions that are hooked through the openings in the adjacent tram chain links. A retaining member, having openings that correspond to the "U"-shaped member's legs, is then attached onto the "U"-shaped member to separate and retain the links in a static position. The ends of the "U"-shaped member's legs are threaded to thereby enable the retaining member to be easily removed. In addition, wedge surfaces are provided on the ends of the legs to cooperate with generally conical aperatures in the crawler pad to enhance fastening. In the preferred embodiment, a crawler pad, similarly adapted for cooperation with the "U"- shaped member, serves as the retaining member.

Accordingly, the present invention provides solutions to the aforementioned problems encountered in the coupling of tram chain links. As this invention provides a larger opening into which the respective tram chain links can be entered, less chain slack is required. In addition, as the present invention includes fasteners that are arranged perpendicular to the axis of chain travel, fastener failure commonly associated with crawler pad movement is reduced.

These and other details, objects, and advantages of the invention will become apparent as the following description of the preferred embodiment thereof proceeds.

BRIEF DESCRIPTION OF THE DRAWINGS

In the accompanying drawings, I have shown a present preferred embodiment of the invention wherein.

DETAILED DESCRIPTION OF THE PREFERRED EMBODIMENTS

Figure 1:
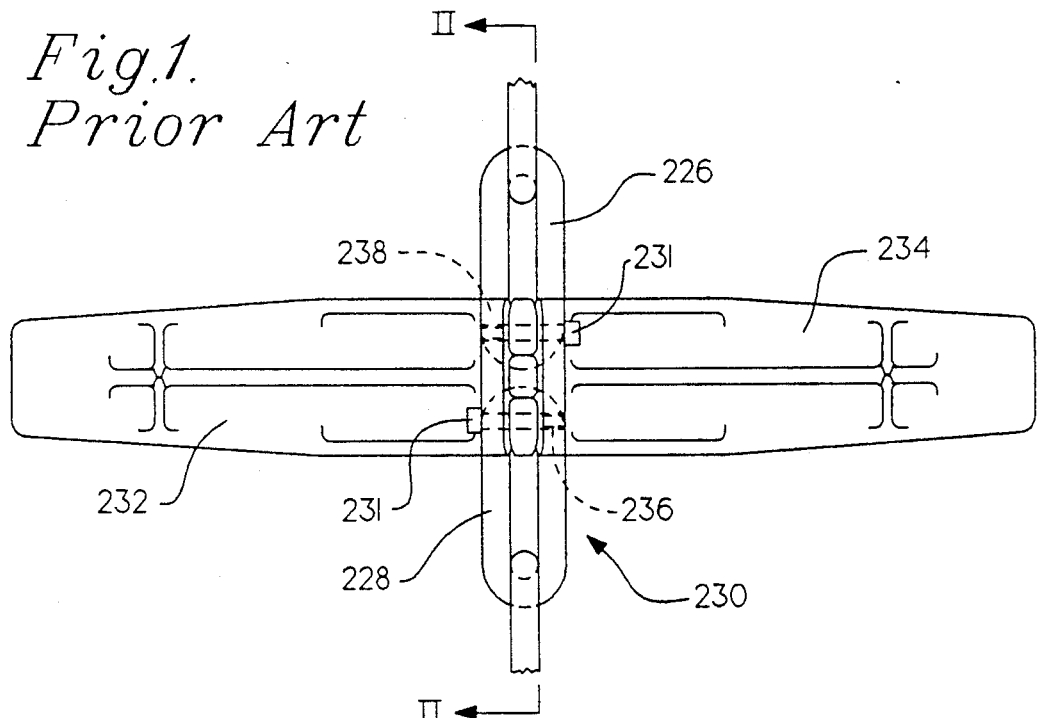
FIG 1 is a stop view of a prior art connection member assembly.
Figure 2:
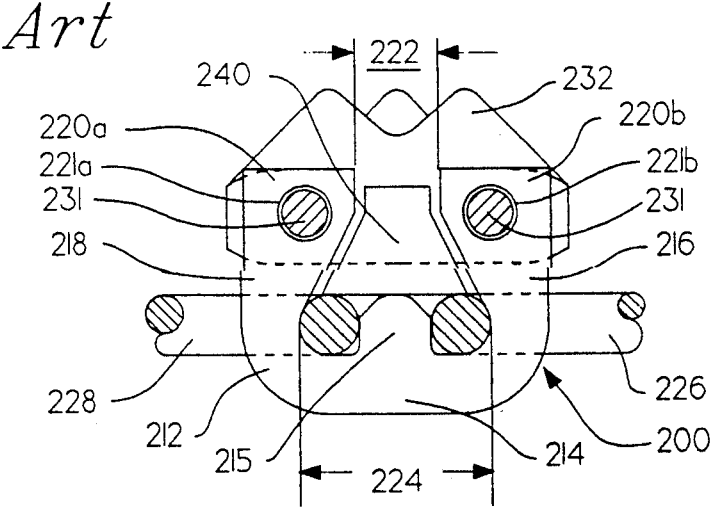
FIG. 2 is a sectional view of a prior art connection member and crawler pad assembly taken along section lines II—II in FIG. 1.
Figure 3:
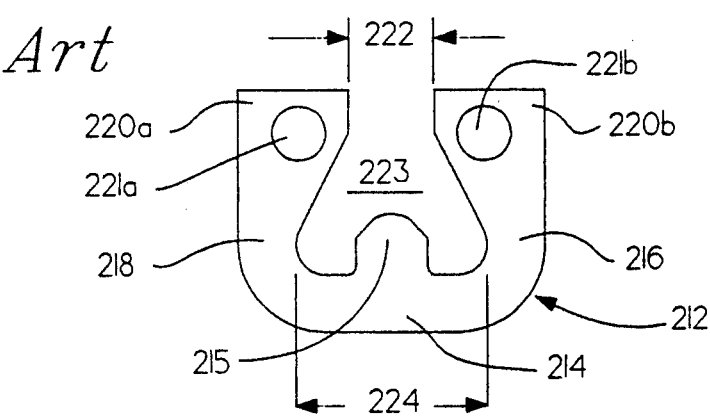
FIG. 3 is a side view of a prior art connection member.

Referring now to the drawings wherein the showings are for purposes of illustrating the present preferred embodiments of the invention only and not for purposes of limiting same, the Figures show a tram chain connection link generally designated as 10.

Figure 4:
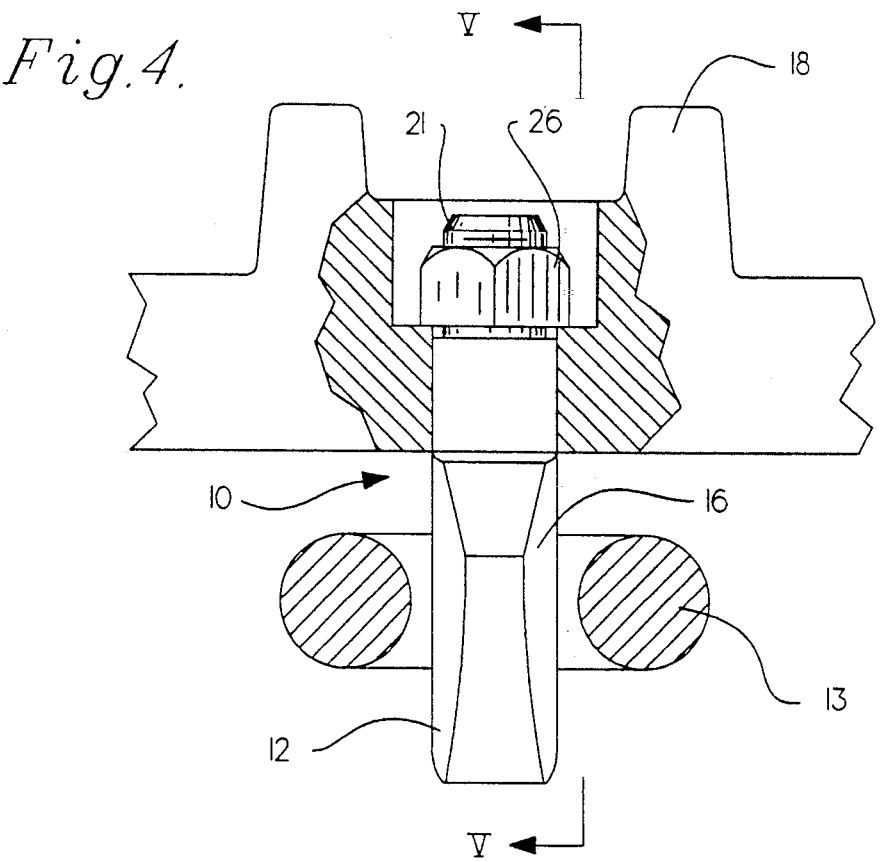
FIG. 4 is a front elevation partial cut-away view of the connection link and crawler pad configuration according to the present invention.
Figure 5:
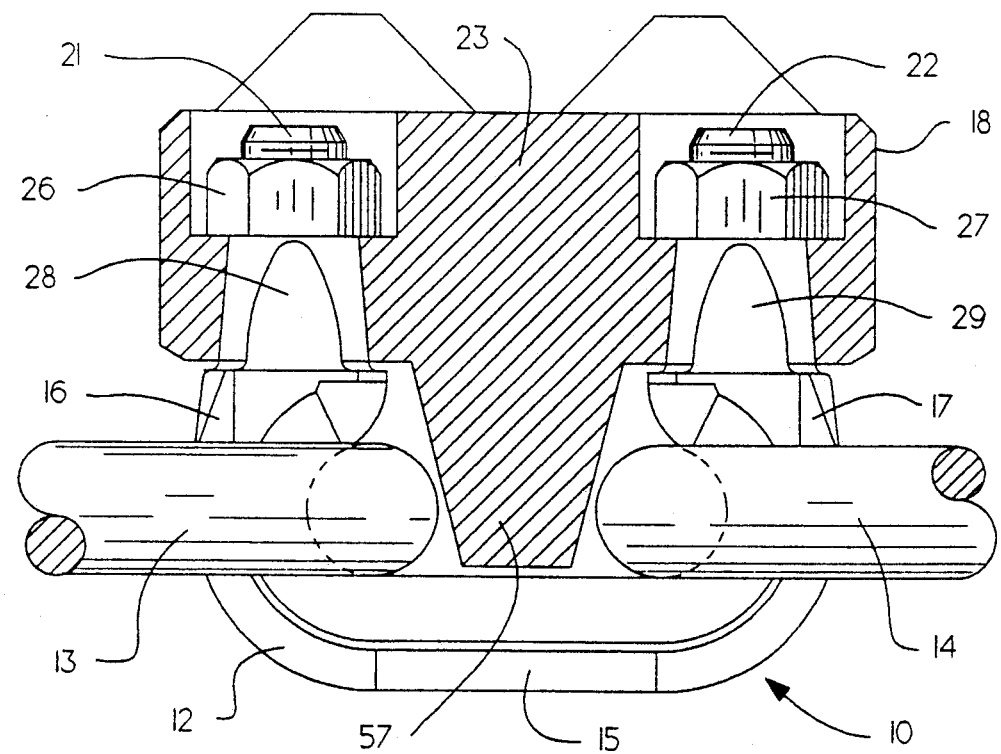
FIG. 5 is a sectional side view of the connection link and crawler pad configuration according to the present invention taken along lines V—V in FIG. 4.

More particularly and with reference to FIGS. 4 and 5, there is shown a connector 10 which may connect a first horizontal chain link 13 with a horizontal second chain link 14 of, for example, a tram chain for a mobile articulated conveyor. Links 13 and 14 are preferably oval or rectangular in plan view and have a circular cross section. It will be appreciated that the connector may be employed in connection with most customary chains having similar links. The connection link 10, consists of a "U"-shaped member 12 that has a horizontal bottom member 15 from which extend legs 16 and 17. Legs 16 and 17 are connected to the ends of horizontal bottom member 15 such that they extend generally perpendicularly therefrom. Accordingly, there is provided an open area 40 which is bounded by legs 16 and 17 and horizontal bottom member 15.

Figure 6:
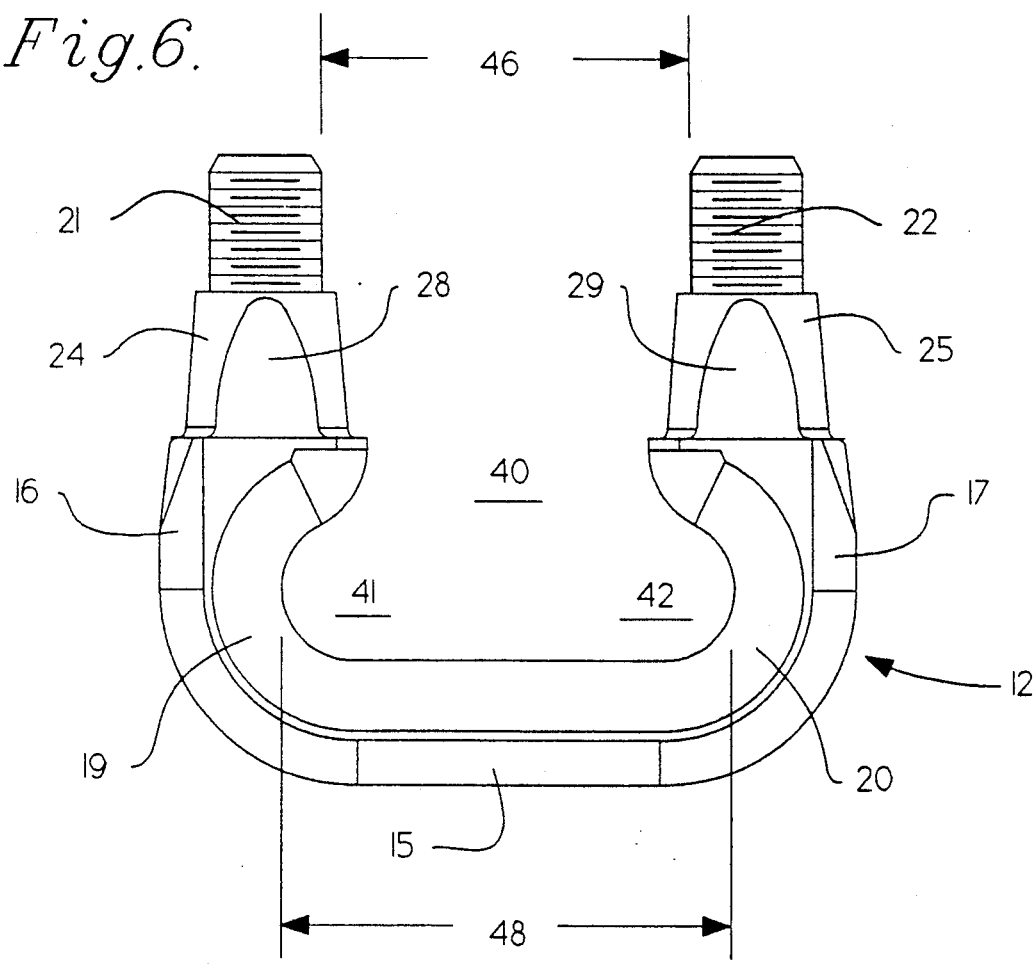
FIG. 6 is a side view of the "U"-shaped member of this invention.

As shown in FIG. 6, legs 16 and 17 each have curved lower portions 19 and 20, respectively, and threaded ends 21 and 22, respectively. Lower portions 19 and 20 each curve slightly inward towards open area 40 thereby creating curvilinear openings 41 and 42, respectively, for receiving first chain link 13 and second chain link 14 therein. The distance 46 between the threaded ends 21 and 22 is slightly greater than the combined cross-sectional diameters of first and second links 13 and 14, respectively, to allow them to be simultaneously passed over the threaded ends 21 and 22. However, the distance 48 between legs 16 and 17 at the points of curvilinear openings 41 and 42 is greater than the distance 46. In addition, legs 16 and 17 each preferably have a tapered section 24 and 25, respectively, that tapers from lower portion 19 or 20 to threaded end 21 or 22, as the case may be. Also, the tapered sections 24 and 25 have flat lateral side areas 28 and 29, respectively.

Figure 7:
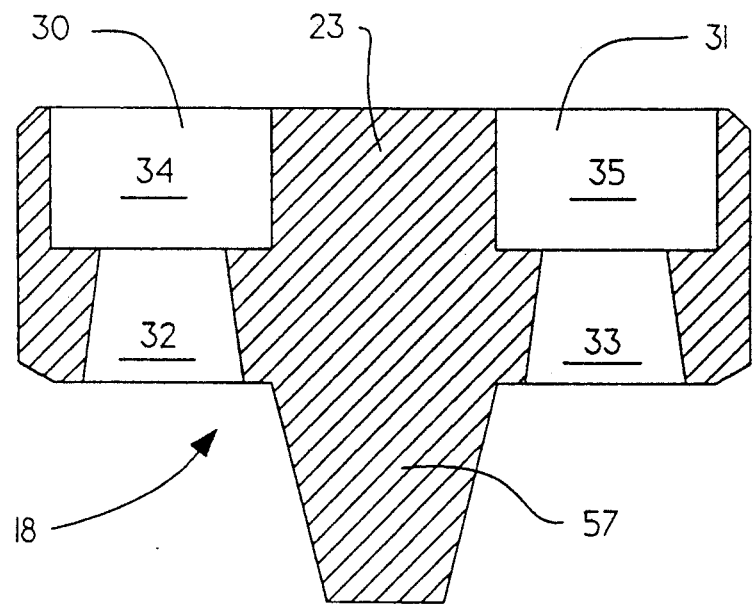
FIG. 7 is a sectional view of a typical retaining member according to the invention.
Figure 8:
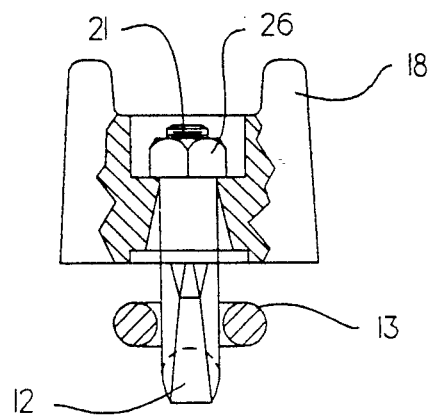
FIG. 8 is a front partial cut-away view of the connection link assembly.

Retaining member 18, as shown in FIGS. 5 and 7 comprises a horizontal cross member 23 for spanning across open area 40 in "U"-shaped member 12. Vertically disposed within horizontal cross member 23 are at least two apertures 30 and 31 which directly correspond to legs 16 and 17, respectively, of "U"-shaped member 12. Accordingly, apertures 30 and 31 each have a widening tapered lower portion 32 and 33 which directly corresponds to the tapered sections 24 and 25 located on the legs 16 and 17 to thereby afford a wedge-like engagement between retaining member 18 and "U"-shaped member 12 as retaining member 18 is secured to "U"-shaped member 12. Apertures 30 and 31 each further have counterbored upper portions 34 and 35, respectively, for receiving retaining nuts 26 and 27, respectively. Moreover, counterbored upper portions 34 and 35 are of a sufficient diameter so as to permit easy access to nuts 26 and 27 by, for example, a socket wrench. It will be appreciated by those skilled in the art that the internal threads may be provided on the ends of the "U"-shaped member 12 with cap screws being provided to threadedly engage the same.

Figure 9:
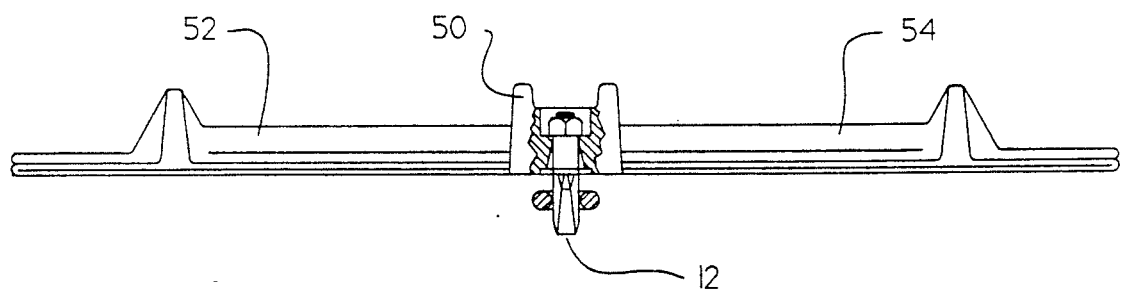
FIG. 9 is a front view of the connection link and crawler pad assembly.
Figure 10:
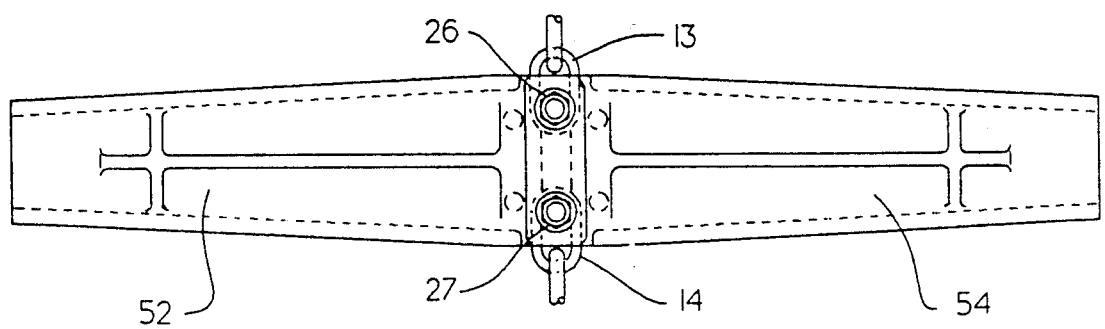
FIG. 10 is a plan view of the connection link and crawler pad assembly.

Retaining member 18 also has a wedge-shaped separator portion 27 that extends generally perpendicularly from the center of horizontal cross member 23. Wedge-shaped separator portion 57 is arranged so as to extend into opening 40 of "U"-shaped member 12 and thereby separate and retain first chain link 13 and second chain link 14 in a relatively static position. In the preferred embodiment, as shown in FIGS. 9 and 10, the retaining member may consist of a crawler pad 50 having laterally extending legs 52 and 54 that is commonly used on mobile articulating conveyors and similarly adapted for insertion onto "U"-shaped member 12. However, the central portion of crawler pad 50 will be similar in all other respects to the connector 18.

In the operation of the instant invention, chain links 13 and 14 are passed over the respective legs 16 and 17 and into the opening 40. It will be appreciated that due to the distance 16 between threaded ends 21 and 22, the chain links 13 and 14 may enter area 40 without substantial, if any, loosening of the overall chain. The chain links 13 and 14, are then received in recessed areas 41 and 42, respectively. The retaining member 18, or the crawler pad 50, is then attached to the "U"-shaped member 12 by causing the threaded ends 21 and 22 to enter the bores 30 and 31, respectively. The threaded ends 21 and 22 are caused to enter the counter bores 34 and 35, respectively, and the bolts 26 and 27 are applied thereto. The tightening of the nuts 26 and 27 causes the tapered portions 24 and 25 to enter into a wedging relationship with the tapered bore portions 32 and 33, respectively. It will be understood that such action serves to further secure the connector 18, or crawler pad 50, to the "U"-shaped member 12.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. A connection link for releasably coupling a first chain link defining a first opening to a coplanar second chain link defining a second opening, comprising:

a "U"-shaped member which is perpendicular to the plane of said first and second links and defines an open area, said "U"-shaped member having a central member parallel to said first and second links and two legs each connected to and extending generally perpendicularly from the ends of said central member such that the distance between the ends of said legs remote from said central member comprises a primary opening between said legs into which said first and second links may be simultaneously entered, such that said first opening receives one of said legs and said second opening receives the other leg;

means for retaining the first and second chain link means on said "U"-shaped member, said means for retaining having a cross member parallel to said central member that extends across said primary opening, said cross member having apertures therethrough to receive the ends of said legs, said means for retaining also comprising means for separating said first and second chain links regardless of chain tension; and means for releasably securing said cross member to said legs.

2. A connection link as recited in claim 1, wherein said securing means comprises:

threaded portions on the ends of each of said legs; and
    internally threaded fastening means which may threadedly engage said threaded portions to secure said cross member to said legs.

3. A connection link as recited in claim 2, wherein each of said legs of said "U"-shaped member further has a tapered portion adjacent to the threaded portion thereof, each said tapered portion tapering toward the corresponding threaded end portions, and each of said apertures in said cross member being tapered to receive said tapered portions therein to thereby create a wedging fit between said cross member and said "U"-shaped member.

4. A connection link as recited in claim 3, wherein said means for separating includes a wedge-shaped separating member connected to and extending generally perpendicularly from the center of said cross member, such that said separating member extends into said open area between said legs of said "U"-shaped member to thereby separate and prevent substantial movement of the first and second chain links.

5. A connection link as recited in claim 4, wherein each of said legs of said "U"-shaped member have an arcuate lower portion for receiving said first and second chain links.

6. A connection link as recited in claim 1, wherein said means for retaining comprises a crawler pad having a leg laterally extending from each side of said central member.

7. A connection link for releasably coupling a first chain link defining a first opening to a coplanar second chain link defining a second opening, comprising:

a "U"-shaped member which is perpendicular to the plane of said first and second links and defines an open area, said "U"-shaped member having a central member parallel to said first and second links and two legs each connected to and extending generally perpendicularly from the ends of said central member such that the distance between the ends of said legs remote from said central member comprises a primary opening between said legs into which said first and second chain links may be entered, such that said first opening receives one of said legs and said second opening receives the other leg;

a cross member parallel to said central member that extends across said primary opening, said cross member comprising a crawler pad having a leg laterally extending from each side of said central member and having apertures therethrough to receive the ends of said legs of said "U"-shaped member, said cross member also comprising means for separating said first and second chain links regardless of chain tension; and means for securing said cross member to said legs.

8. A connection link as recited in claim 7, wherein said securing means comprises:

threaded portions on the ends of said legs; and
    internally threaded fastening means which may threadedly engage said threaded portions to secure said cross member to said legs.

9. A connection link for releasably coupling a first chain link defining a first opening to a coplanar second chain link defining a second opening, comprising:

a "U" shaped member which is perpendicular to the plane of said first and second links and defines an open area, said "U"-shaped member having a central member parallel to said first and second links and two legs each connected to and extending generally perpendicularly from the ends of said central member such that the distance between the ends of said legs remote from said central member comprises a primary opening into which said first and second chain links may be entered, such that said first opening receives one of said legs and said second opening receives the other leg;

a crawler pad having a leg laterally extending from each side of said central member and a cross member parallel to said central member that extends across said primary opening, said horizontal cross member having apertures therethrough to receive the ends of said legs;

threaded portions on the ends of said legs;
    internally threaded fastening means which may threadedly engage said threaded portions to secure said cross member to said legs; and
    wherein each of said legs of said "U"-shaped member further has a tapered portion adjacent to the threaded portion thereof, said tapered portion tapering toward the corresponding threaded end portions, and of each said apertures in said cross member being tapered to receive said tapered portions therein to thereby create a wedging fit interface between said cross member and said "U"-shaped member.

10. A connection link as recited in claim 9, wherein said first and second chain links may be simultaneously entered into said primary opening.

11. A connection link as recited in claim 9, wherein each of said legs of said "U"-shaped member have an arcuate lower portion for receiving said first and second chain links.

12. A connection link for releasably coupling a first chain link defining a first opening to a coplanar second chain link defining a second opening, comprising:

a "U"-shaped member which is perpendicular to the plan of said first and second links and defines an open area, said "U"-shaped member having a central member parallel to said first and second links and two legs, each leg having a threaded end portion and a tapered portion adjacent to said threaded end portion wherein each said tapered portion tapers towards the corresponding threaded end portion, said legs being connected to and extending generally perpendicularly from the ends of said central member such that the distance between the threaded ends of said legs remote from the central member comprises a primary opening into which said first and second chain links may be entered, such that the first opening receives one of said legs and second opening receives the other leg;

a cross member parallel to said central member that extends across said primary opening, said cross member having tapered apertures therethrough adapted to receive said tapered portions therein to thereby create a wedging fit between said retaining and said "U"-shaped members; and internally threaded fastening means which may threadedly engage said threaded portions to secure said cross member to said legs.

13. A connection link as recited in claim 12, wherein said cross member includes a wedge-shaped separating member connected to and extending generally perpendicularly from the center of said cross member, such that said separating member extends into said open area between said legs of said "U"-shaped member to thereby separate and prevent substantial movement of the first and second chain links.

14. A connection link as recited in claim 13 wherein each of said legs of said "U"-shaped member have an arcuate lower portion for receiving said first and second chain links.

* * * * *

UNITED STATES PATENT AND TRADEMARK OFFICE
CERTIFICATE OF CORRECTION

PATENT NO. : 5,165,766
DATED : November 24, 1992
INVENTOR(S) : Terry M. Thomas

It is certified that error appears in the above-identified patent and that said Letters Patent is hereby corrected as shown below:

Col. 1, line 20, delete "faze" and substitute therefor --face--.

Col. 3, line 25, delete "stop" and substitute therefor --top--.

Signed and Sealed this

Second Day of November, 1993

Attest:

BRUCE LEHMAN

Attesting Officer

Commissioner of Patents and Trademarks